(12) United States Patent
Burkholder

(10) Patent No.: US 10,919,557 B1
(45) Date of Patent: Feb. 16, 2021

(54) MOBILE BASE FOR INFANT CAR SEAT

(71) Applicant: Alison P. Burkholder, Haymarket, VA (US)

(72) Inventor: Alison P. Burkholder, Haymarket, VA (US)

( * ) Notice: Subject to any disclaimer, the term of this patent is extended or adjusted under 35 U.S.C. 154(b) by 0 days.

(21) Appl. No.: 16/539,722

(22) Filed: Aug. 13, 2019

(51) Int. Cl.
B62B 5/08 (2006.01)
B62B 7/14 (2006.01)
B60N 2/28 (2006.01)

(52) U.S. Cl.
CPC .............. B62B 5/08 (2013.01); B60N 2/2848 (2013.01); B62B 7/145 (2013.01)

(58) Field of Classification Search
CPC .......... B62B 5/08; B62B 7/145; B62B 2/2848
See application file for complete search history.

(56) References Cited

U.S. PATENT DOCUMENTS

| 2,435,733 | A | 6/1946 | Belyeu |
| 2,574,743 | A | 11/1951 | King |
| 3,944,241 | A | 3/1976 | Epelbaum |
| 4,537,414 | A | 8/1985 | Nusbaum |
| 4,570,956 | A | 2/1986 | Dyer |
| 4,620,711 | A | 11/1986 | Dick |
| 4,632,409 | A | 12/1986 | Hall et al. |
| 4,762,331 | A | 8/1988 | Tucker et al. |
| D298,019 | S | 10/1988 | McMillen |
| 4,828,281 | A | 5/1989 | Sanchas |
| 4,852,894 | A | 8/1989 | Dyer |
| 4,874,182 | A | 10/1989 | Clark |
| 4,878,680 | A | 11/1989 | Molnar |
| 5,149,113 | A | 9/1992 | Alldredge |
| 5,234,224 | A | 8/1993 | Kim |
| 5,248,181 | A * | 9/1993 | Efthimiou ................ A47D 1/10 297/130 |
| 5,474,311 | A | 12/1995 | Tyciak et al. |
| 6,296,259 | B1 | 10/2001 | Anderson |
| 6,938,915 | B2 | 9/2005 | Bischoff et al. |
| 7,311,353 | B1 | 12/2007 | Johnson |
| 7,540,507 | B1 | 6/2009 | Kennedy |
| 7,624,954 | B2 | 12/2009 | Randle, Jr. et al. |
| 9,260,039 | B1 | 2/2016 | Satterfield |
| D815,442 | S * | 4/2018 | Harmon ........................ D6/349 |
| 2010/0052397 | A1 * | 3/2010 | Mishly .................... A47C 4/283 297/451.4 |

* cited by examiner

Primary Examiner — John D Walters
Assistant Examiner — James J Triggs
(74) Attorney, Agent, or Firm — Staas & Halsey LLP

(57) ABSTRACT

Upper and lower platforms are connected by at least one adjustable telescoping pillar. The lower platform has bottom surface with at least one, e.g., at least three wheels affixed thereto. At least one engagement structure is mounted on a top surface of the upper platform to engage an infant car seat. When an infant car seat is mounted on the upper platform, a child, secured in the infant car seat, can be propelled to or from a motor vehicle by pushing on the infant car seat with the wheels in contact with the ground.

18 Claims, 7 Drawing Sheets

MOBILE BASE FOR INFANT CAR SEAT

BACKGROUND OF THE INVENTION

1. Field of the Invention

A mobile base that provides transportation for a child in a car seat outside of a motor vehicle.

2. Description of the Related Art

Convertible carriers for infants and small children that can be used in an automobile and outside an automobile have been known for several decades. Some, such as U.S. Pat. Nos. 2,574,743; 4,537,414; 4,570,956; 5,234,224; and 7,624,954 have two parts—a wheeled platform and a seat that can be removed from the wheeled platform and used in an automobile. The handles may be part of the wheeled frame, as in U.S. Pat. Nos. 4,570,956 and 5,234,224, or attached to the seat used in a car, as in U.S. Pat. Nos. 2,574,743; 4,537,414; and D298,019. In either case, the handles either telescope (and may also rotate) or, in the case of U.S. Pat. No. 5,234,224, are hinged at the base of the frame for more compact storage in an automobile. In addition, there are adjustable scissor legs in U.S. Pat. Nos. 5,234,224 and 7,624,954 (which also has four vertical legs) to raise the frame that holds the car seat off the ground for stroller use.

Alternatively, the car seat/stroller may be a single piece with wheels that retract or rotate and handle(s) that telescope inward when used as a car seat. Examples of such single-piece car-seat/strollers can be found in U.S. Pat. Nos. 3,944,241; 4,632,409; 4,762,331; 4,852,894; 4,874,182; 4,878,680; 5,149,113; 6,296,259; and 7,311,353. The stroller/car seat in U.S. Pat. No. 2,435,733 has collapsible handles and a hinged frame by which a pair of wheels are moved from below the seat when used as a stroller to alongside the seat in a car. Instead of retracting the wheels, the stroller U.S. Pat. No. 4,620,711 has four wheels that are longitudinally separated and are moved close together via a hinge near the middle of the seatback when used as a car seat. Both of these hinged frames leave the child much higher than in a conventional car seat.

Another variation is to mount a wheeled seat in a separate base when used in an automobile, as in U.S. Pat. Nos. 6,938,915; 7,540,507; 4,828,281; and 9,260,039. The first two can only be used by a short-legged infant, as the wheels extend little, if at all, when used as a stroller, while the last two have extendable legs that raise the child well off the ground, like the separate wheeled platforms in U.S. Pat. Nos. 5,234,224 and 7,624,954.

SUMMARY OF THE INVENTION

An aspect is to provide a wheeled base of simple design usable with at least one widely available car seat to provide a mobile base for a child's car seat, so that the car seat can be rolled away from a motor vehicle with the child in the car seat.

Another aspect is to provide a wheeled base for a car seat that can be easily adjusted in height without changes to wheelbase.

A further aspect is to use different colors, textures or other indicators for each of the selectable heights to make it easier for a user to select a height that is comfortable for their use.

A mobile base for a removable automotive child seat includes upper and lower platforms, each having top and bottom surfaces with at least one wheel mounted on the bottom surface of the lower platform. At least one adjustable telescoping pillar is affixed substantially perpendicular to the top surface of the lower platform and the bottom surface of the upper platform.

In an embodiment, a single adjustable telescoping pillar is affixed to the upper and lower platforms. In an embodiment in which the upper and lower platforms have a flat and solid top surface with substantially identical triangular shapes, the single adjustable telescoping pillar is affixed at the centroid of the triangular shapes.

In an embodiment, there are at least three wheels on the bottom surface of the lower platform with at least one of the three wheels pivotable about an axis substantially perpendicular to the lower platform. In the embodiment in which the upper and lower platforms have substantially identical triangular shapes, three wheels are mounted near the corners of the lower triangular shape which has rounded corners.

In an embodiment, at least one engagement structure is mounted on the top surface of the upper platform to engage with a matching structure on the bottom of the removable automotive child seat to securely attach the mobile base with the child seat.

In an embodiment, the telescoping pillar has longitudinally spaced openings of substantially identical size and shape on at least one side. As one example, the openings are circular and a sphere, disposed inside each pillar, is forced towards an outer surface of the pillar by a spring.

In an embodiment, different indicators surround each of the longitudinally spaced openings. The indicators may use different colors, textures and/or symbols.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENTS

Figure 1:
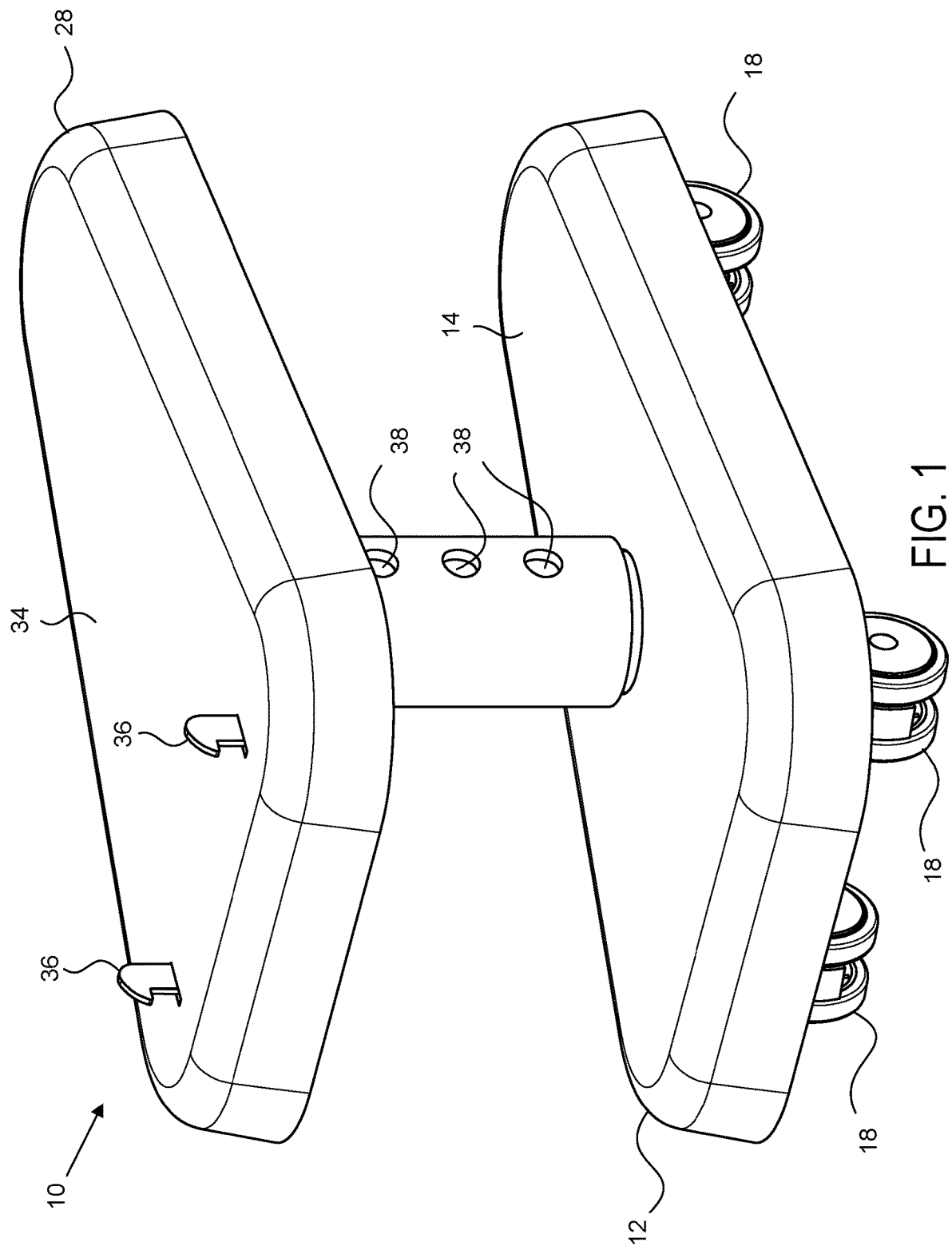
FIG. 1 is a top, rear and right side perspective view of a mobile base for a child's car seat.

Reference will now be made in detail to the preferred embodiments, examples of which are illustrated in the accompanying drawings, wherein like reference numerals refer to like elements throughout.

An embodiment of a mobile base 10 is illustrated in FIGS. 1-7. As illustrated in FIG. 1, the mobile base 10 has a lower platform 12 with a top surface 14. The bottom surface 16 of lower platform 12 is visible in FIG. 6. Three wheels 18 are affixed to the bottom surface 16 of the lower platform 12 by any conventional method, such as adhesive or fasteners (not shown) connecting the wheel housings 20 to structures 22 on the bottom surface 16 of the lower platform 12. At least one wheel 18a may be pivotable about an axis substantially perpendicular to the lower platform 12.

Figure 6:
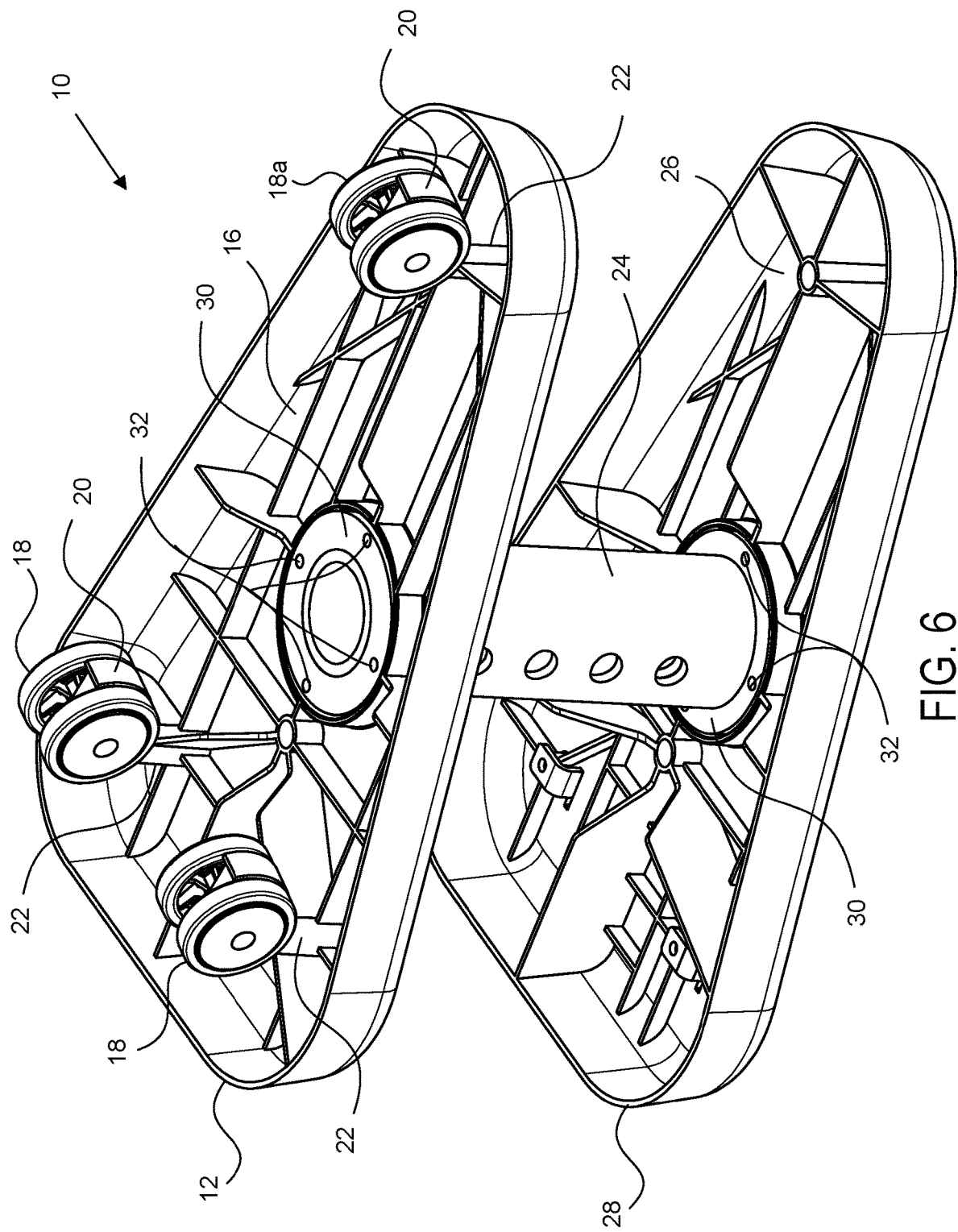
FIG. 6 is a bottom, front and left side perspective view of the base illustrated in FIG. 1.

At least one adjustable telescoping pillar 24 is affixed substantially perpendicular to the top surface 14 of the lower platform 12 and, as illustrated in FIG. 6, to the bottom surface 26 of an upper platform 28. In the illustrated embodiment, the telescoping pillar 24 is cylindrical, but the cross section of the pillar 24 may be any shape with sufficient rigidity, such as oval or polygonal, e.g., triangular, rectangular, hexagonal, octagonal, etc., or other shapes. As illustrated in FIG. 6, the telescoping pillar 24 may be affixed to the upper and lower platforms 28, 12 by a flange 30 which may be an integral part of the pillar 24, or may be attached to the pillar by any conventional technique, including welding, fasteners, adhesive, etc. The flange 30 may be affixed to the upper and lower platforms 28, 12 by fasteners 32 or any other conventional technique.

Figure 7:
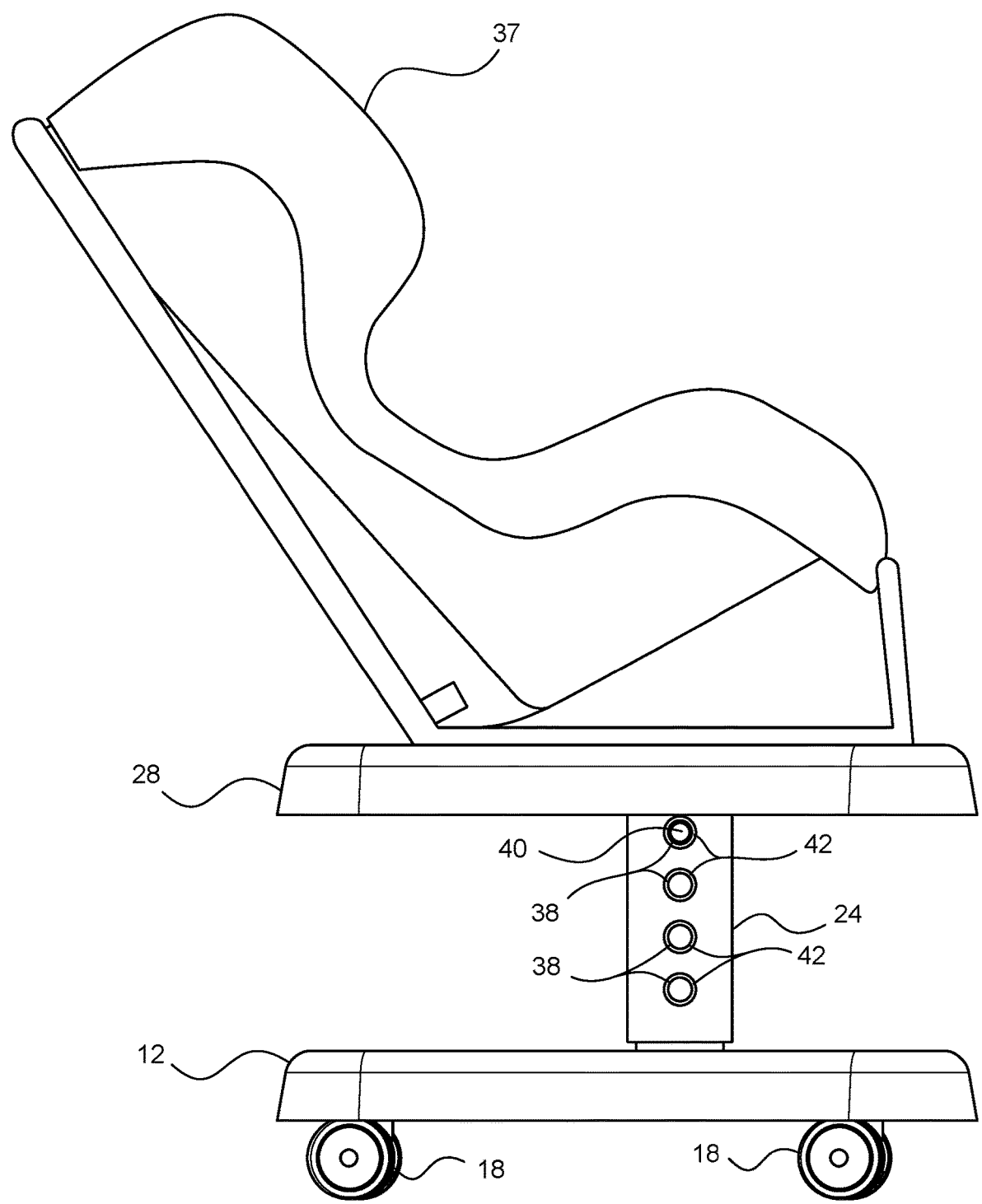
FIG. 7 is a side view of the base from the left with a schematically illustrated child's car seat mounted on the base.

In the illustrated embodiment, the top surface 34 of the upper platform 28 has an engagement structure 36 for securing an automotive child seat 37 that is schematically illustrated in FIG. 7. The mobile base 10 secures the automotive child seat 37 in the same manner as conventionally secured in a motor vehicle. An automotive child seat 37 that is currently widely available can be secured to the illustrated engagement structure 36; however the engagement structure 36 may have a different design that accommodates the securing mechanism of other automotive child seats.

Alternative securing devices (not illustrated) could be used, such as belts or hooks (not shown) for an automotive child seat that does not have a securing mechanism that engages with the engagement structure 36. Such alternative securing devices may be permanently or removably mounted on the mobile base 10, or may use structural features, optionally including the engagement structure 36, to hold the alternative securing devices in place on the mobile base 10.

Figure 2:
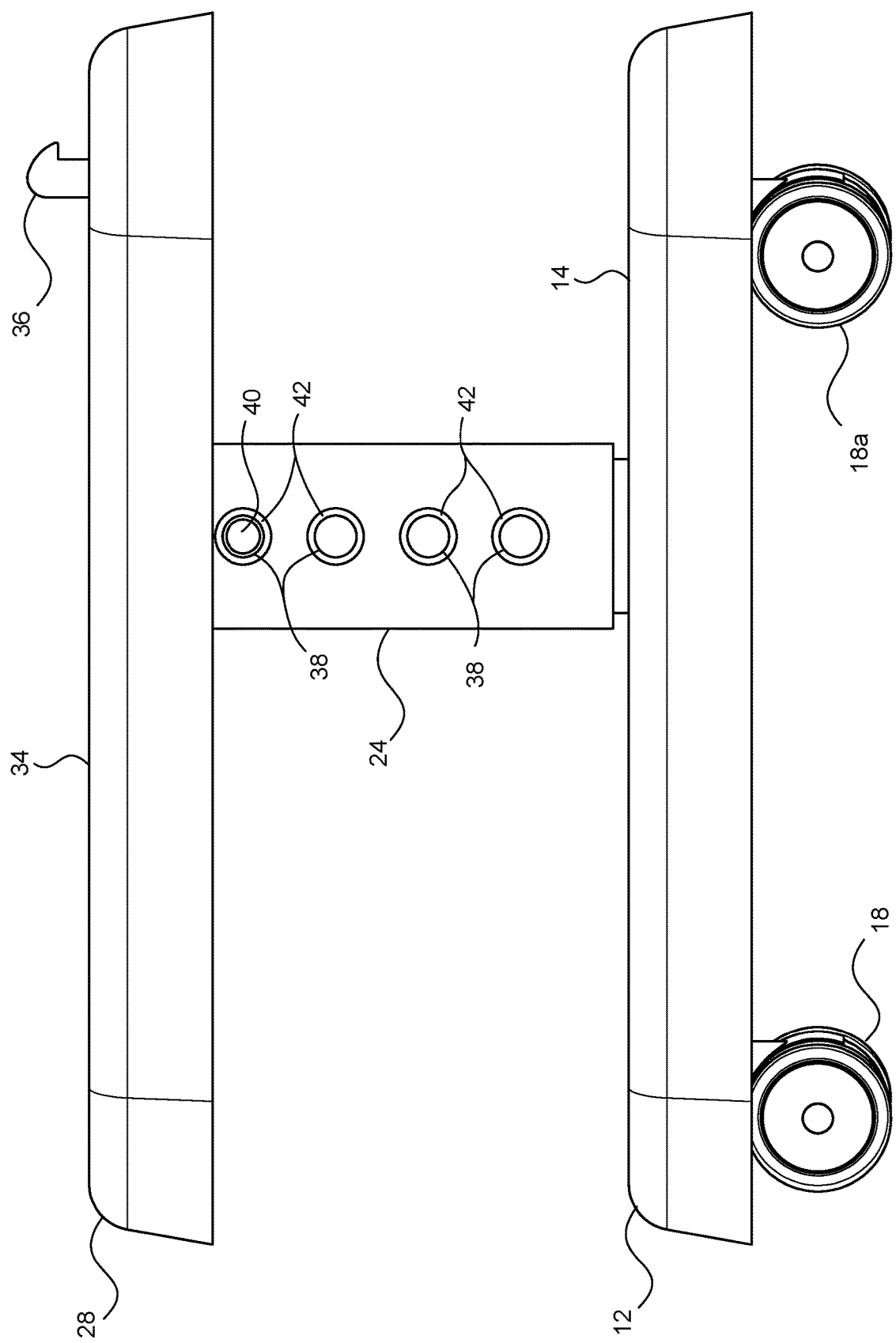
FIG. 2 is a left side view of the base illustrated in FIG. 1.
Figure 3:
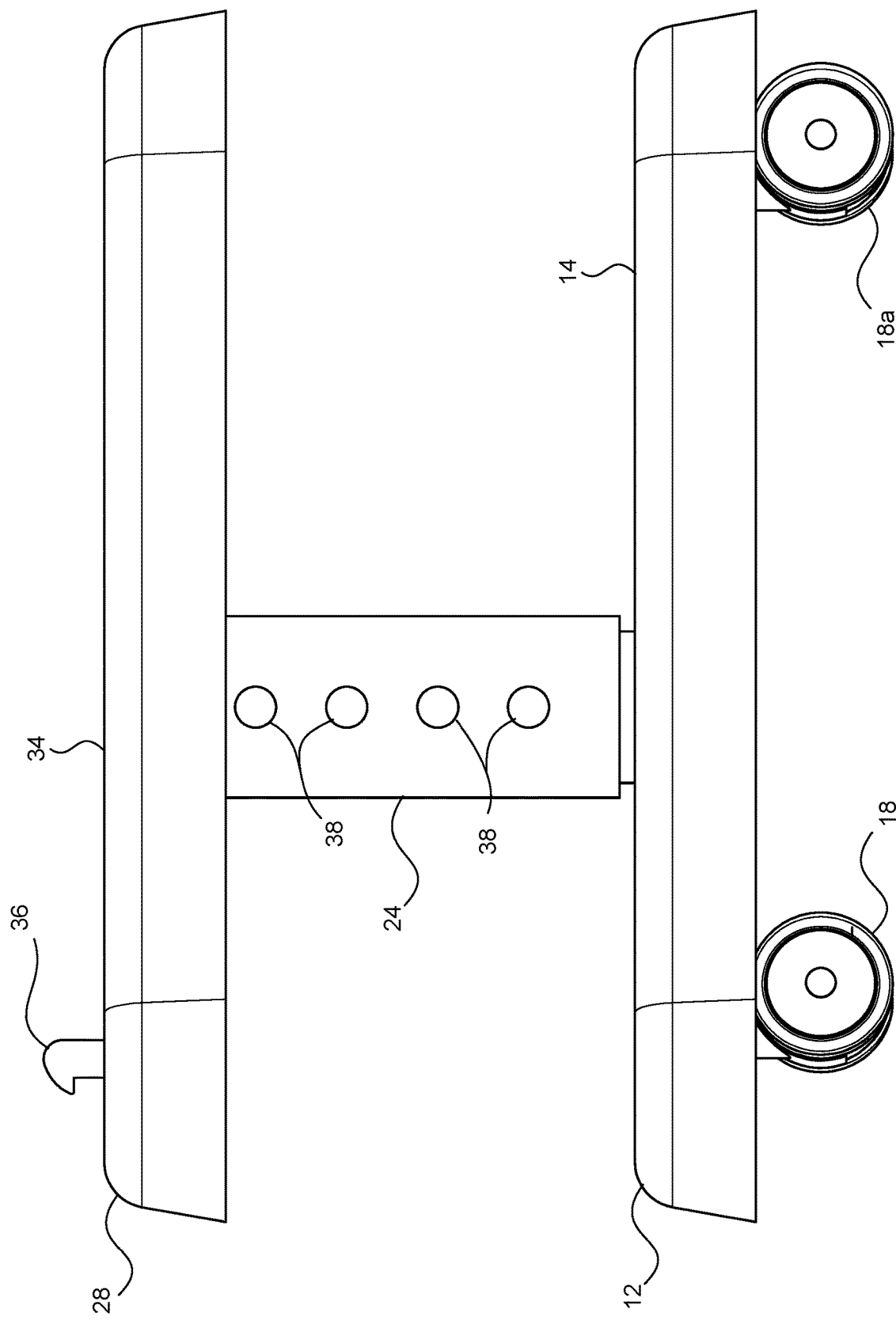
FIG. 3 is a right side view of the base illustrated in FIG. 1.
Figure 4:
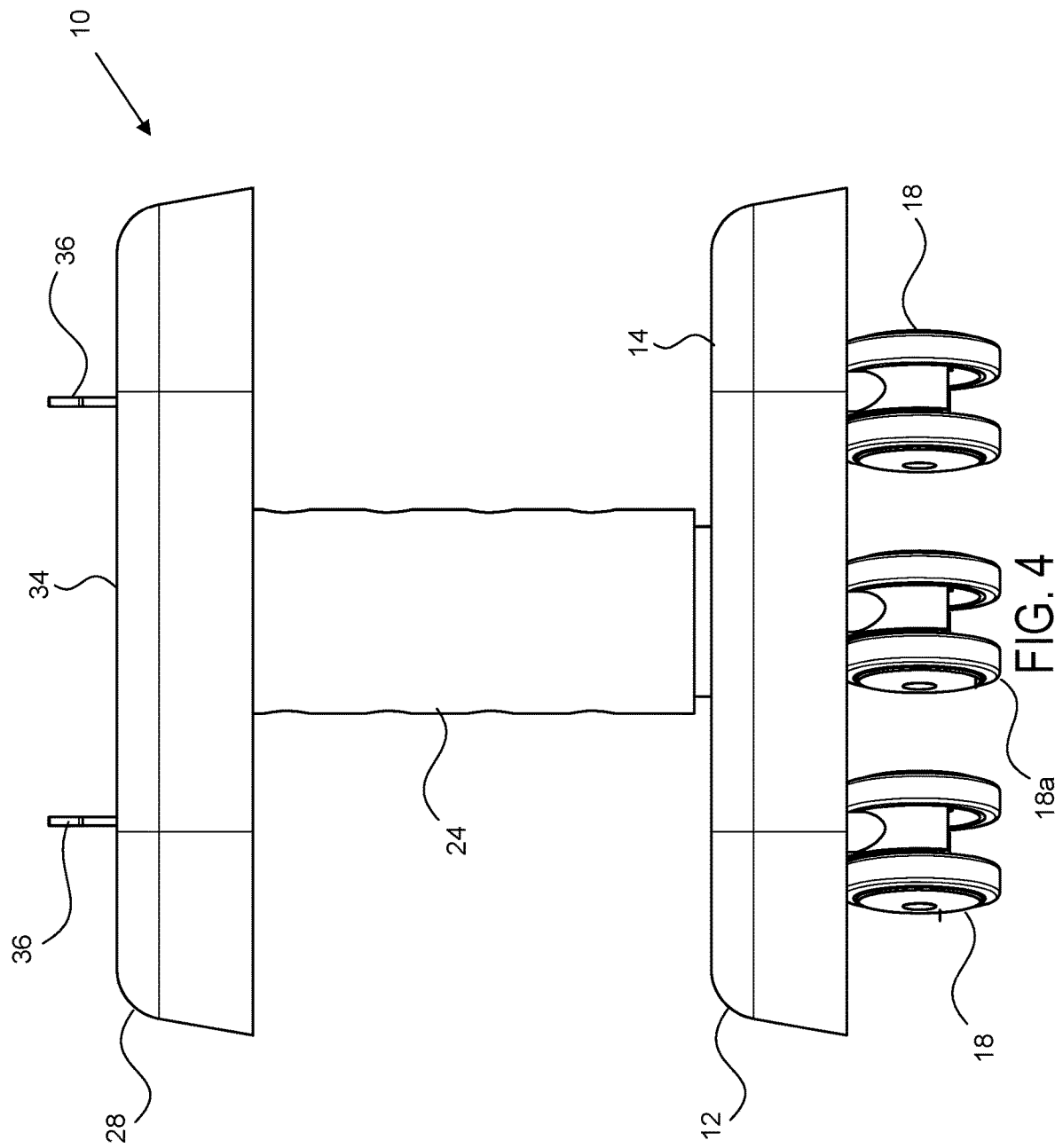
FIG. 4 is a front view of the base illustrated in FIG. 1.
Figure 5:
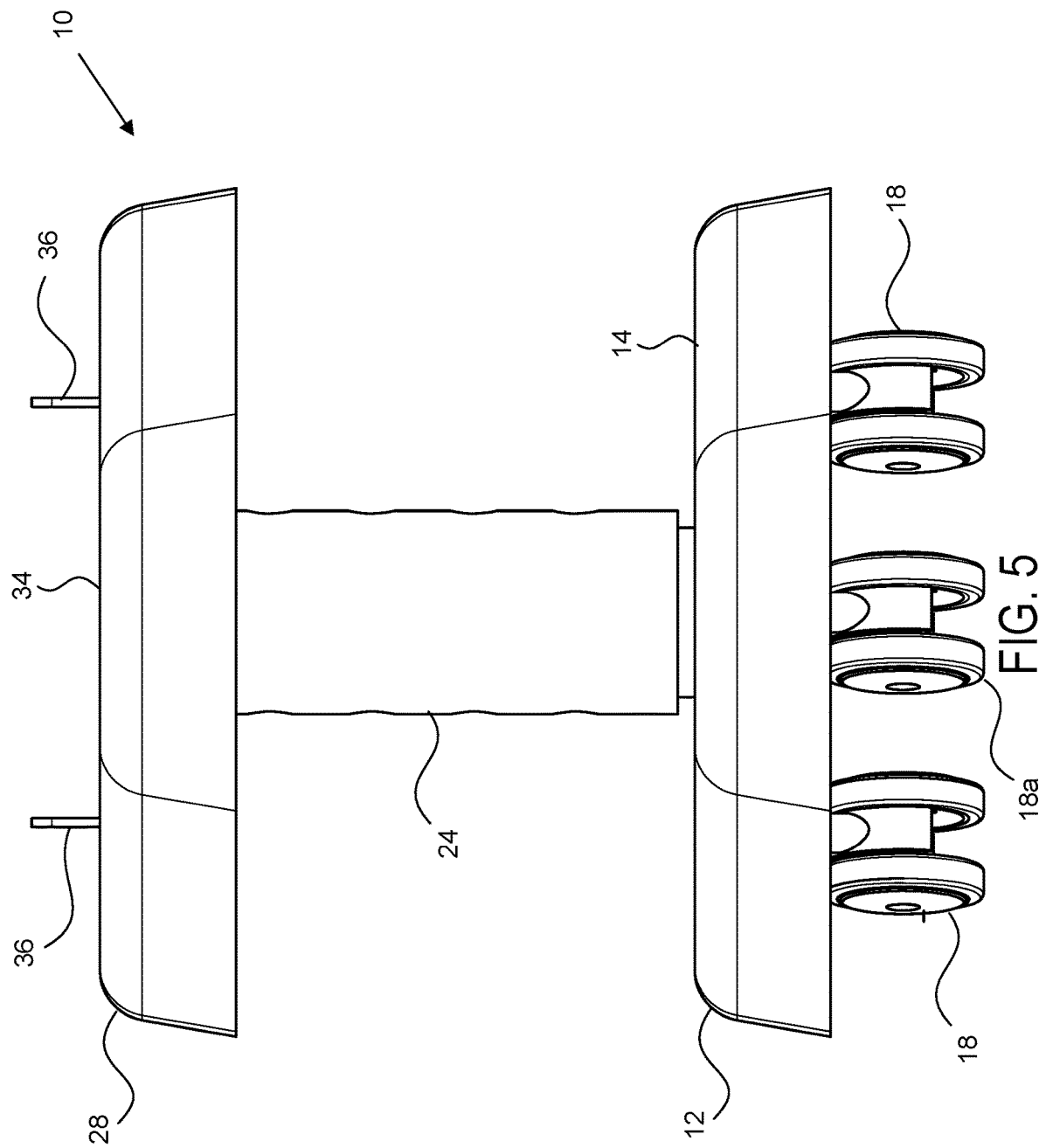
FIG. 5 is a rear view of the base illustrated in FIG. 1.

In the illustrated embodiment, the telescoping pillar 24 has longitudinally spaced openings 38 of substantially identical size and shape on opposing sides; however, the openings 38 may be provided on only a single side of the pillar 24, such as the left side illustrated in FIG. 2. The pillar 24 is adjustable in height by providing locking means for locking the telescoping pillar 24 at a height. The illustrated means for locking the pillar is a "snap button" formed by a sphere 40, disposed inside the telescoping pillar 24, having a diameter that is larger than the diameter of the openings 38. The diameter of sphere 40 is small enough that a significant portion of the sphere protrudes through one of the longitudinally spaced openings 38 on the side of the telescoping pillar, as known in the art. For example, the diameter of the sphere may be less than 50% larger than the diameter of the openings 38. The sphere 40 may be forced towards the outer surface of the telescoping pillar 24 by a spring (not shown) in a conventional manner. A "snap button" may be provided on each side of the pillar, although only shown on the left side in the drawings. Alternatively, or in addition, a pin (not shown) with a cross section smaller in area than the openings 38, may be used for locking the height of the mobile base 10. In the illustrated embodiment, a pin could be used in combination with the snap button 40 at any height other than the highest.

As illustrated in FIG. 2, at least one side of pillar 24 may have an area 42 surrounding each of the openings 38 that provide different indicators for each of the openings 38. The indicators may differ in one or more of color or texture. In addition, or alternatively, at least one symbol may be provided in each area, with a different symbol, such as a letter, number, or geometric shape, near each opening 38. Such symbols may be positioned next to corresponding openings, or formed around the opening or repeated in the area around the opening. When symbols are used, the area surrounding each of the openings 38 may be larger than illustrated in FIG. 2, when color and/or texture is used, the surrounding area may be smaller, as illustrated.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

What is claimed is:

1. A mobile base for a removable automotive child seat, comprising:
    a lower platform having top and bottom surfaces with at least one wheel mounted on the bottom surface of the lower platform;
    an adjustable telescoping pillar affixed substantially perpendicular to the top surface of the lower platform at a centroid of the substantially identical triangular shape; and
    an upper platform having top and bottom surfaces, the top surface of each of the upper and lower platforms having a perimeter in a substantially identical triangular shape with rounded corners, the adjustable telescoping pillar being affixed substantially perpendicular to the bottom surface of the upper platform at the centroid of the substantially identical triangular shape, and the top surface of the upper platform having a pair of upstanding hook features, respectively positioned adjacent left and right corners of the upper platform, removably securing the removable automotive child seat to the mobile base.

2. The mobile base as recited in claim 1, wherein the top surface of the upper and lower platforms is a flat, solid surface.

3. The mobile base as recited in claim 2, wherein the bottom surface of the lower platform has at least three wheels affixed thereto with at least one of the three wheels pivotable about an axis substantially perpendicular to the lower platform.

4. The mobile base as recited in claim 3, wherein the adjustable telescoping pillar is a single adjustable telescoping pillar with longitudinally spaced openings of substantially identical size and shape on at least one side.

5. The mobile base as recited in claim 4, wherein at least one of the at least one side of the single adjustable telescoping pillar has an area, surrounding each of the longitudinally spaced openings, with different indicators surrounding each of the longitudinally spaced openings.

6. The mobile base as recited in claim 5, wherein the different indicators include at least one of different colors, textures and symbols.

7. The mobile base as recited in claim 6, further comprising locking means for locking the single adjustable telescoping pillar at a height by protruding through one of the longitudinally spaced openings on at least one of the at least one side of the single adjustable telescoping pillar.

8. The mobile base as recited in claim 7,
    wherein each of the longitudinally spaced openings is substantially circular with a first diameter, and wherein the locking means on each of the at least one side of the single adjustable telescoping pillar comprises
  a sphere, disposed inside the single adjustable telescoping pillar, having a second diameter larger than the first diameter and less than 50% larger than the first diameter, and
  a spring forcing the sphere towards an outer surface of the single adjustable telescoping pillar.

9. The mobile base as recited in claim 1, wherein the top surface of the upper and lower platforms is a flat, solid surface.

10. The mobile base as recited in claim 1, wherein the bottom surface of the lower platform has at least three wheels affixed thereto with at least one of the three wheels pivotable about an axis substantially perpendicular to the lower platform.

11. The mobile base as recited in claim 1, wherein the adjustable telescoping pillar has longitudinally spaced openings of substantially identical size and shape on at least one side.

12. The mobile base as recited in claim 11, wherein at least one of the at least one side of the adjustable telescoping pillar has an area, surrounding each of the longitudinally spaced openings, with different indicators surrounding each of the longitudinally spaced openings.

13. The mobile base as recited in claim 12, wherein the different indicators include at least one of different colors, textures and symbols.

14. The mobile base as recited in claim 1, further comprising locking means for locking each of the at least one adjustable telescoping pillar at a height by protruding through one of the longitudinally spaced openings on at least one of the at least one side of each of the at least one adjustable telescoping pillar.

15. The mobile base as recited in claim 14, wherein each of the longitudinally spaced openings is substantially circular with a first diameter, and
wherein the locking means on each of the at least one side of each of the at least one adjustable telescoping pillar comprises
  a sphere, disposed inside a corresponding adjustable telescoping pillar, having a second diameter larger than the first diameter and less than 50% larger than the first diameter, and
  a spring forcing the sphere towards an outer surface of the corresponding adjustable telescoping pillar.

16. The mobile base as recited in claim 1, wherein the two upstanding hook features on the top surface of the upper platform are two substantially identical flat hooks having a hook shape in profile.

17. The mobile base as recited in claim 16, wherein each of the two substantially identical flat hooks have substantially parallel sides with the hook shape, the parallel sides separated by a thickness at least 25% smaller than maximum dimensions perpendicular to the thickness and each other.

18. The mobile base as recited in claim 17, wherein the hook shape of the parallel sides of each of the two substantially identical flat hooks has a rounded top smoothly joining a front edge having a first length, the front edge substantially perpendicular to the top surface of the upper platform; a rear edge, substantially parallel to the front edge, with a second length smaller than the first length; and a substantially horizontal edge extending rearwards from a top of the rear edge to a rear-most point of the rounded top.

* * * * *